(12) United States Patent
Adrangi et al.

(10) Patent No.: US 10,271,191 B2
(45) Date of Patent: *Apr. 23, 2019

(54) PROCEDURES TO PROVISION AND ATTACH A CELLULAR INTERNET OF THINGS DEVICE TO A CLOUD SERVICE PROVIDER

(71) Applicant: Intel IP Corporation, Santa Clara, CA (US)

(72) Inventors: Farid Adrangi, Lake Oswego, OR (US); Muthaiah Venkatachalam, Beaverton, OR (US); Puneet Jain, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/632,790

(22) Filed: Jun. 26, 2017

(65) Prior Publication Data

US 2017/0311115 A1 Oct. 26, 2017

Related U.S. Application Data

(62) Division of application No. 14/927,965, filed on Oct. 30, 2015, now Pat. No. 9,693,178.

(Continued)

(51) Int. Cl.
*H04W 4/80* (2018.01)
*H04W 12/06* (2009.01)
(Continued)

(52) U.S. Cl.
CPC ............. *H04W 4/80* (2018.02); *H04L 9/3263* (2013.01); *H04L 63/0823* (2013.01);
(Continued)

(58) Field of Classification Search
CPC ............................... H04W 8/005; H04L 67/34
(Continued)

(56) References Cited

U.S. PATENT DOCUMENTS

| 9,693,178 B2 | 6/2017 | Adrangi et al. |
| 2012/0331298 A1 | 12/2012 | Xu et al. |

(Continued)

FOREIGN PATENT DOCUMENTS

| EP | 2566281 A1 | 3/2013 |
| TW | I615053 B | 2/2018 |

(Continued)

OTHER PUBLICATIONS

"3GPP; TSG Services and System Aspects; Security aspects of machine-type and other mobile data applications communications enhancements (Release 12)", 3GPP TR 33.868 V0.17.0, (Feb. 24, 2014).

(Continued)

*Primary Examiner* — Kiet M Doan
(74) *Attorney, Agent, or Firm* — Schwegman Lundberg & Woessner, P.A.

(57) ABSTRACT

A cellular IoT (CIoT) device can comprise a coverage and/or processing constrained device e.g., devices operating primarily MTC or M2M (e.g., sensor devices, controller devices, etc.). These devices can have limited or no user interface, and can be used for machines or devices with little mobility. CIoT devices can be deployed in usage scenarios such as home automation (e.g., security, appliances, energy packages, etc.), industry automation, and smart cities with low-power devices (e.g., devices having a battery life of several years), and can be easily installed and operated in challenging coverage conditions, such as lower or basement levels of buildings. CIoT devices can be provisioned to connect to a cellular carrier network and an associated CSP.

(Continued)

The CSP can execute end2end solutions (e.g., service portal, service sign-up, etc.) while the cellular carrier can provide the bulk data pipe to the CSP.

18 Claims, 11 Drawing Sheets

Related U.S. Application Data

(60) Provisional application No. 62/134,975, filed on Mar. 18, 2015.

(51) Int. Cl.
*H04W 4/70* (2018.01)
*H04L 29/06* (2006.01)
*H04L 9/32* (2006.01)
*H04W 12/04* (2009.01)
*H04L 9/08* (2006.01)

(52) U.S. Cl.
CPC ............ *H04W 4/70* (2018.02); *H04W 12/04* (2013.01); *H04W 12/06* (2013.01); *H04L 9/08* (2013.01); *H04L 63/06* (2013.01); *H04L 2209/38* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/166* (2018.01); *Y02D 70/21* (2018.01); *Y02D 70/23* (2018.01); *Y02D 70/24* (2018.01); *Y02D 70/26* (2018.01)

(58) Field of Classification Search
USPC ........... 455/434, 414.1, 450, 435.1; 370/328, 370/252; 713/171
See application file for complete search history.

(56) References Cited

U.S. PATENT DOCUMENTS

| | | |
|---|---|---|
| 2013/0046983 A1 | 2/2013 | Zhu et al. |
| 2013/0157673 A1 | 6/2013 | Brusilovsky |
| 2014/0047322 A1* | 2/2014 | Kim ................... G06F 17/2247 715/234 |
| 2014/0181517 A1* | 6/2014 | Alaranta ............... H04L 63/062 713/168 |
| 2014/0244568 A1 | 8/2014 | Goel et al. |
| 2014/0351592 A1* | 11/2014 | Starsinic ................. H04W 4/70 713/168 |
| 2016/0037340 A1* | 2/2016 | Rayment ............. H04L 63/0853 370/338 |
| 2016/0278147 A1 | 9/2016 | Adrangi et al. |
| 2017/0006528 A1 | 1/2017 | Bari |

FOREIGN PATENT DOCUMENTS

| | | |
|---|---|---|
| WO | WO-2011092138 A1 | 8/2011 |
| WO | WO-2013123445 A1 | 8/2013 |

OTHER PUBLICATIONS

"U.S. Appl. No. 14/927,965, Non Final Office Action dated Oct. 31, 2016", 13 pgs.

"U.S. Appl. No. 14/927,965, Notice of Allowance dated Feb. 23, 2017", 9 pgs.

"U.S. Appl. No. 14/927,965, Response filed Jan. 31, 2017 to Non Final Office Action dated Oct. 31, 2016", 6 pgs.

"International Application Serial No. PCT/US2016/014820, International Search Report dated Jun. 9, 2016", 3 pgs.

"International Application Serial No. PCT/US2016/014820, Written Opinion dated Jun. 9, 2016", 4 pgs.

"European Application Serial No. 16765370.8, Partial Supplementary European Search Report dated Aug. 20, 2018", 17 pgs.

* cited by examiner

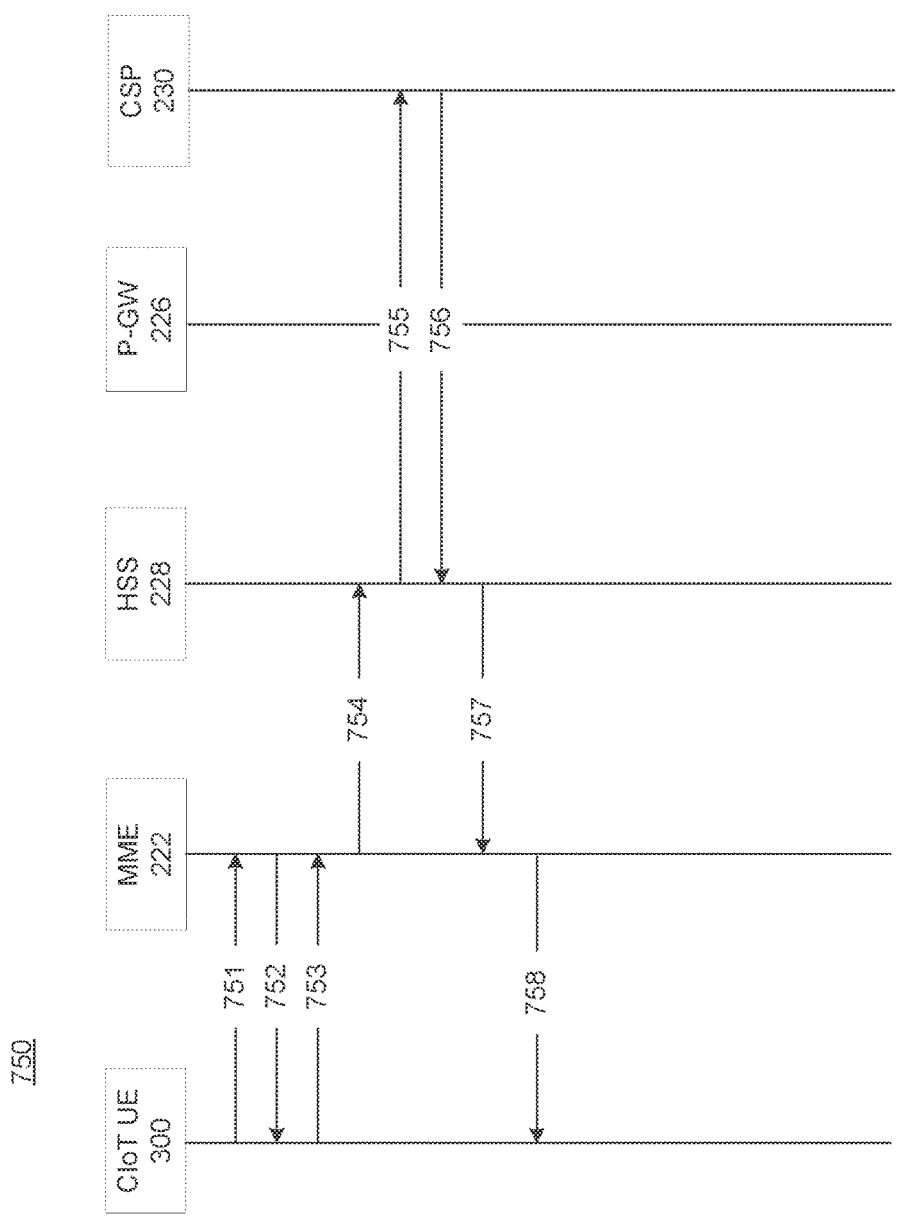

PROCEDURES TO PROVISION AND ATTACH A CELLULAR INTERNET OF THINGS DEVICE TO A CLOUD SERVICE PROVIDER

PRIORITY CLAIM

This application is a divisional of U.S. patent application Ser. No. 14/927,965 filed Oct. 30, 2015, which claims the benefit of priority to U.S. Provisional Patent Application Ser. No. 62/134,975, filed Mar. 18, 2015, the entire contents of which are hereby incorporated by reference herein.

TECHNICAL FIELD

Embodiments pertain to wireless communications. Some embodiments relate to cellular Internet of Things (CIoT) user equipment (UE).

BACKGROUND

Wireless mobile devices or user equipments (UEs) may communicate with each other via cellular networks using radio access technologies such as the 3GPP Long-Term Evolution ("LTE") standard, 3GPP LTE Advanced Release 12 (March 2014) (the "LTE-A Standard"), the IEEE 802.16 standard, IEEE Std. 802.16-2009, published May 29, 2009 ("WiMAX") as well as any other wireless protocols that are designated as 3G, 4G, 5G, and beyond. Technologies such as machine type communications (MTC) networks, sensor networks or Internet of Things (IoT) (which describes interconnecting uniquely identifiable embedded computing devices within the internet infrastructure) can utilize user equipments (UEs) configured to connect to one or more cellular networks and cloud service providers.

BRIEF DESCRIPTION OF THE DRAWINGS

FIG. 7A-FIG. 7B illustrate flow diagrams of a process for provisioning a cellular Internet of Things user equipment in accordance with some embodiments.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In some embodiments, mobile devices or other devices described herein can be part of a portable wireless communication device, such as a personal digital assistant (PDA), a laptop or portable computer with wireless communication capability, a web tablet, a wireless telephone, a smartphone, a wireless headset, a pager, a wearable mobile computing device (e.g., a mobile computing device included in a wearable housing), an instant messaging device, a digital camera, an access point, a television, a medical device (e.g., a heart rate monitor, a blood pressure monitor, etc.), or another device that can receive and/or transmit information wirelessly. In some embodiments, the mobile device or other device can be a user equipment (UE) or an Evolved Node-B (eNodeB) configured to operate in accordance with 3GPP standards (e.g., the 3GPP Long Term Evolution ("LTE") Advanced Release 12 (March 2014) (the "LTE-A Standard")). In some embodiments, the mobile device or other device can be configured to operate according to other protocols or standards, including IEEE 802.11 or other IEEE and 3GPP standards. in some embodiments, the mobile device or other device can include one or more of a keyboard, a display, a non-volatile memory port, multiple antennas, a graphics processor, an application processor, speakers, and other mobile device elements. The display can be a liquid crystal display (LCD) screen including a touch screen.

Figure 1:
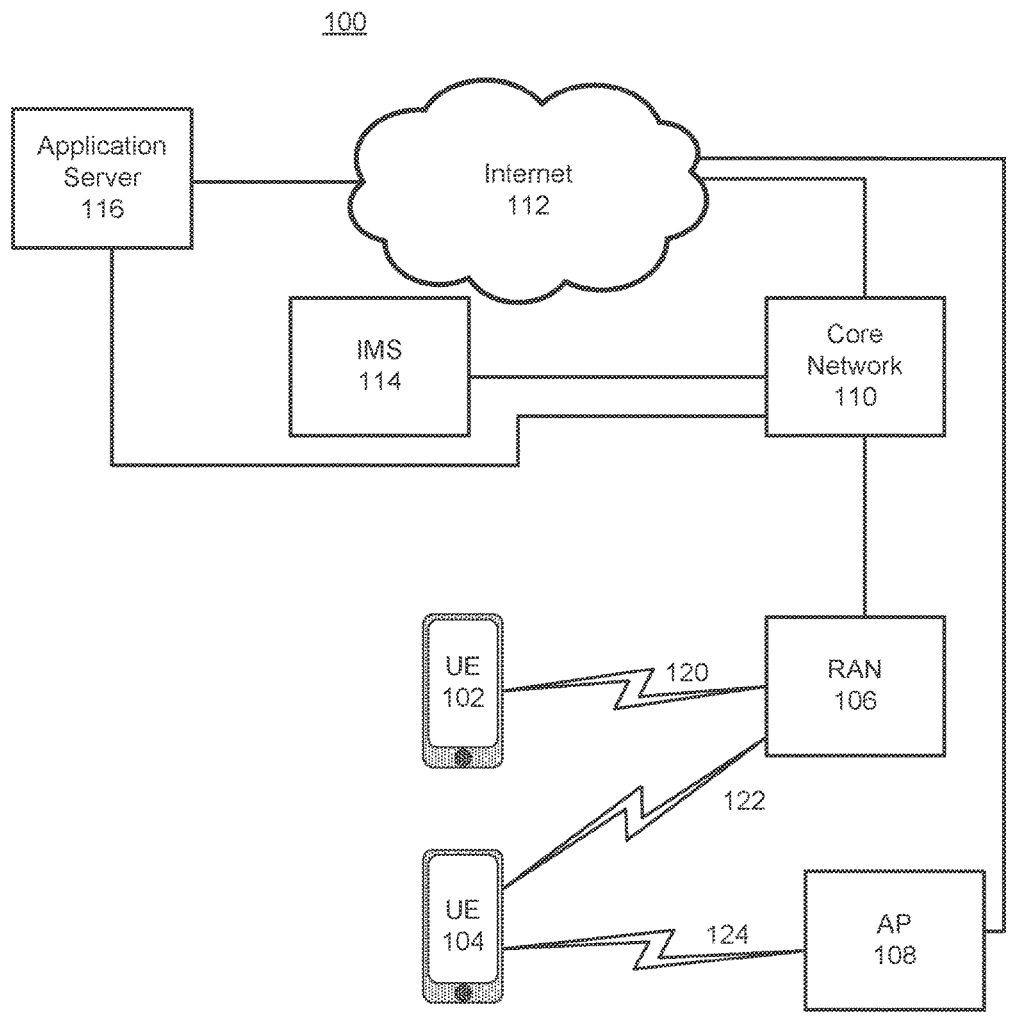
FIG. 1 illustrates an architecture of a wireless network with various components of the network in accordance with some embodiments.

FIG. 1 illustrates an architecture of a wireless network with various components of the network in accordance with some embodiments. A system 100 is shown to include a user equipment (UE) 102 and a UE 104. The UEs 102 and 104 are illustrated as smartphones (i.e., handheld touchscreen mobile computing devices connectable to one or more cellular networks), but can also include personal digital assistants (PDAs), pagers, laptop computers, desktop computers, etc. In some embodiments described in further detail below, any of the UEs 102 and 104 can comprise a cellular Internet of Things (CIoT) UE, which can comprise a network access layer designed for low-power IoT applications utilizing short-lived UE connections.

A CIoT UE can utilize technologies such as machine-to-machine (M2M) or machine-type communications (MTC) for (machine initiated) exchanging data with an MTC server and/or device via a public land mobile network (PLMN), device-to-device (D2D) communication, sensor networks, or IoT networks. An IoT network describes interconnecting uniquely identifiable embedded computing devices (within the interact infrastructure) having short-lived connections, in addition to background applications (e.g., keep-alive messages, status updates, etc.) executed by the CIoT UE.

The UEs 102 and 104 are configured to access a radio access network (RAN) 106 via connections 120 and 122, respectively, each of which comprises a physical communications interface or layer; in this embodiment, the connections 120 and 122 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, etc.

The RAN 106 can include one or more access points that enable the connections 120 and 122. These access points (described in further detail below) can be referred to as access nodes, base stations (BSs), NodeBs, evolved NodeBs (eNodeBs), etc., and can comprise ground stations (i.e., terrestrial access points) or satellite access points. The RAN 106 is shown to be communicatively coupled to a core network 110. The core network 110 can be used to enable a packet-switched data exchange with the Internet 112 in addition to bridging circuit-switched calls between the UEs 102 and 104. In some embodiments, the RAN 106 can comprise an Evolved Universal Mobile Telecommunications System (UMTS) Terrestrial RAN (E-UTRAN), and the core network 110 can comprise an Evolved Packet Core (EPC) network.

The UE 104 is shown to be configured to access an access point (AP) 108 via a connection 124. The connection 124 can comprise a local wireless connection, such as a connection consistent with IEEE 802.11, wherein the AP 108 would comprise a wireless fidelity (WiFi) router. In this example, the AP 108 is shown to be connected to the Internet 112 without connecting to the core network 110.

The Internet 112 is shown to be communicatively coupled to an application server 116. The application server 116 can be implemented as a plurality of structurally separate servers, or can be included in a single server. The application server 116 is shown as connected to both the Internet 112 and the core network 110; in other embodiments, the core network 110 connects to the application server 116 via the Internet 112. The application server 116 can also be configured to support one or more communication services (e.g., Voice-over-Internet Protocol (VoIP) sessions, Push-to-Talk (PTT) sessions, group communication sessions, social networking services, etc.) for UEs that can connect to the application server 116 via the core network 110 and/or the Internet 112. The application server 116 can also be configured as a cloud services provider (CSP) for CIoT UEs, as described in further detail below.

The core network 110 is further shown to be communicatively coupled to an Internet Protocol (IP) Multimedia Subsystem (IMS) 114. The IMS 114 comprises an integrated network of telecommunications carriers that can enable the use of IP for packet communications, such as traditional telephony, fax, e-mail, internet access, Voice over IP (VoIP), instant messaging (IM), videoconference sessions and video on demand (VoD), etc.

Figure 2:
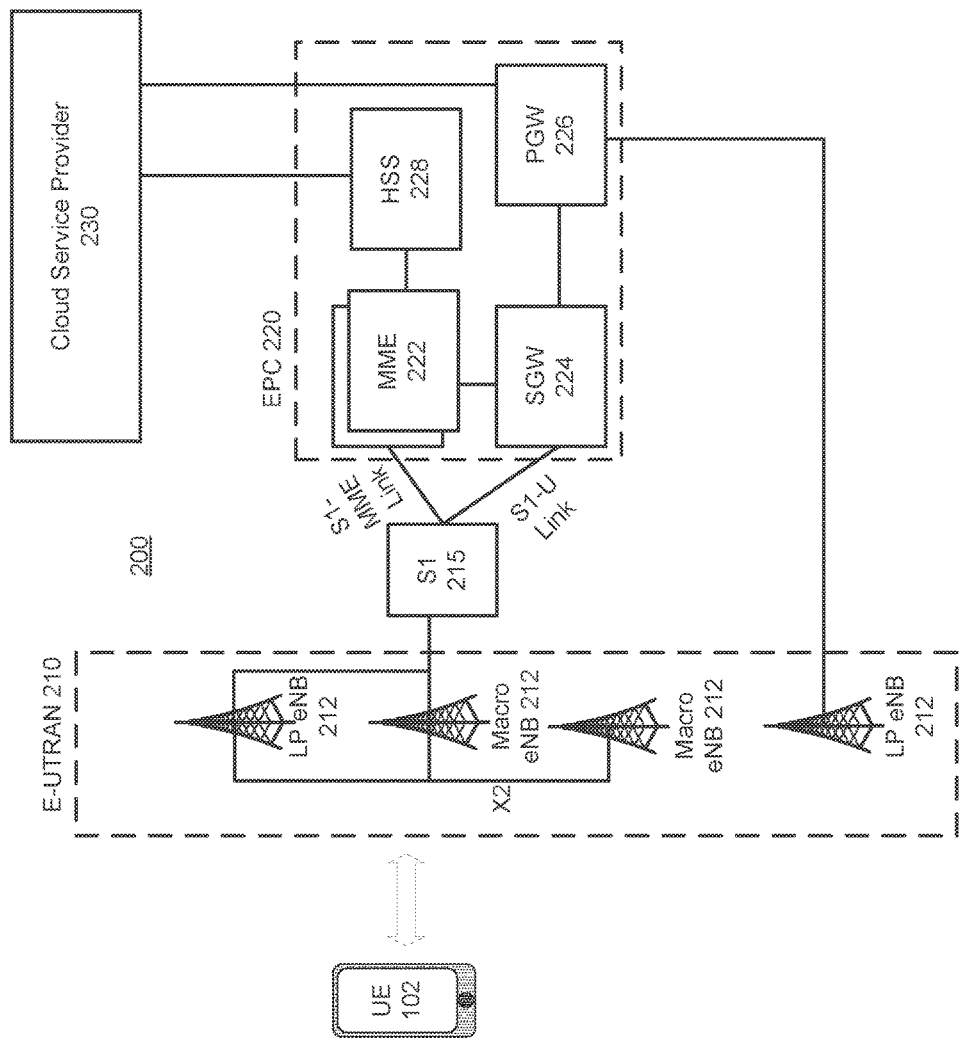
FIG. 2 illustrates an architecture of components of an LTE network in accordance with some embodiments.

FIG. 2 illustrates an architecture of components of an LTE network in accordance with some embodiments. In this example, a (sub)system 200 comprises an Evolved Packet System (EPS) on an LTE network, and thus includes an E-UTRAN 210 and an EPC network 220 communicatively coupled via an S1 interface 215. In this illustration, only a portion of the components of the E-UTRAN 210 and the EPC network 220 are shown. Some of the elements described below may be referred to as "modules" or "logic." As referred to herein, "modules" or "logic" may describe hardware (such as a circuit), software (such as a program driver), or a combination thereof (such as a programmed microprocessing unit).

The E-UTRAN 210 includes eNodeBs 212 (which can operate as base stations) for communicating with one or more UEs (e.g., the UE 102). The eNodeBs 212 are shown in this example to include macro eNodeBs and low-power (LP) eNodeBs. Any of the eNodeBs 212 can terminate the air interface protocol and can be the first point of contact for the UE 102. In some embodiments, any of the eNodeBs 212 can fulfill various logical functions for the E-UTRAN 210 including but not limited to radio network controller (RNC) functions such as radio bearer management, uplink and downlink dynamic radio resource management and data packet scheduling, and mobility management. eNodeBs in EPS/LTE networks, such as the eNodeBs 212, do not utilize a separate controller (i.e., an RNC) to communicate with the EPC network 220; in other embodiments utilizing other specification protocols, RANs can include an RNC to enable communication between BSs and core networks.

In accordance with some embodiments, the UE 102 can be configured to communicate using Orthogonal Frequency-Division Multiplexing (OFDM) communication signals with any of the eNodeBs 212 over a multicarrier communication channel in accordance with various communication techniques, such as an Orthogonal Frequency-Division Multiple Access (OFDMA) communication technique or a Single Carrier Frequency Division Multiple Access (SC-FDMA) communication technique, although the scope of the embodiments is not limited in this respect. The OFDM signals can comprise a plurality of orthogonal subcarriers.

In accordance with some embodiments, the UE 102 can be configured to determine a synchronization reference time based on reception of one or more signals from any of the eNodeBs 212. The UE 102 can also be configured to support device-to-device (D2D) communication with other UEs using OFDMA, SC-FDMA, or other multiple access schemes.

The S1 interface 215 is the interface that separates the E-UTRAN 210 and the EPC network 220. It is split into two parts: the S1-U, which carries traffic data between the eNodeBs 212 and a serving gateway (S-GW) 224, and the S1-MME, which is a signaling interface between the eNodeBs 212 and one or more mobility management entities (MMES) 222. An X2 interface is the interface between the eNodeBs 212. The X2 interface can comprise two parts (not shown): the X2-C and X2-U. The X2-C is the control plane interface between the eNodeBs 212, while the X2-U is the user plane interface between the eNodeBs 212.

With cellular networks, low-power cells can be used to extend coverage to indoor areas where outdoor signals do not reach well, or to add network capacity in areas with very dense phone usage, such as train stations. As used herein, the term "LP eNodeB" refers to any suitable relatively low-power eNode B for implementing a narrower cell (i.e., narrower than a macro cell) such as a femtocell, a picocell, or a micro cell at the edge of the network. Femtocell eNodeBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, an LP eNodeB might be a femtocell eNodeB since it is coupled through a packet data network gateway (P-GW) 226. Similarly, a picocell is a wireless communication system typically covering a small area, such as in-building (offices, shopping malls, train stations, etc.) or, more recently, in-aircraft. A picocell eNodeB can generally connect through the X2 link to another eNodeB such as a macro eNodeB through its base station controller (BSC) functionality. Thus, an LP eNodeB can be implemented with a picocell eNodeB since it is coupled to a macro eNodeB via an X2 interface. Picocell eNodeBs or other LP eNodeBs can incorporate some or all functionality of a macro eNodeB. In some cases, a picocell eNodeB can be referred to as an AP BS or enterprise femtocell.

The UE 102 performs cell selection upon power-up and cell reselections throughout its operation. The UE 102 searches for a cell provided by the E-UTRAN 210 (e.g., a macro cell or a picocell). During the cell reselection process, the UE 102 can measure reference signal strength for each neighboring cell (e.g., Reference Signal Received Power/Reference Signal Received Quality (RSRP/RSRQ)) and select a cell based on this measurement (e.g., select a cell with the highest RSRP value). After the UE 102 selects a cell, it can verify the accessibility of the cell by reading the master information block (MIB). If the UE 102 fails to read the MIB of the selected cell, it can discard the selected cell and repeat the above process until a suitable cell is discovered.

A radio resource control (RRC) state indicates whether an RRC layer of the UE 102 is logically connected to an RRC layer of the E-UTRAN 210. After the UE 102 is communicatively coupled to a cell, its RRC state is RRC_IDLE. When the UE 102 has data packets to transmit or receive, its RRC state becomes RRC_CONNECTED. The UE 102, when in an RRC_IDLE state, can associate itself to different cells.

In some embodiments, a downlink resource grid can be used for downlink transmissions from any of the eNodeBs 212 to the UE 102, while uplink transmission from the UE 102 to any of the eNodeBs 212 can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quantity of resources that currently can be allocated. There are several different physical downlink channels that are conveyed using such resource blocks.

The physical downlink shared channel (PDSCH) carries user data and higher-layer signaling to the UE 102. The physical downlink control channel (PDCCH) carries information about the transport format and resource allocations related to the PDSCH channel, among other things. It also informs the UE 102 about the transport format, resource allocation, and H-ARQ (Hybrid Automatic Repeat Request) information related to the uplink shared channel. Typically, downlink scheduling (assigning control and shared channel resource blocks to the UE 102 within a cell) is performed at any of the eNodeBs 212 based on channel quality information fed back from the UE 102 to any of the eNodeBs 212, and then the downlink resource assignment information is sent to the UE 102 on the control channel (PDCCH) used for (assigned to) the UE 102.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four Quadrature Phase Shift Keying (QPSK) symbols are mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

The EPC network 220 includes the MMEs 222, the S-GW 224, the P-GW 226, and a home subscriber server (HSS) 228. The MMEs 222 are similar in function to the control plane of legacy Serving General packet radio service (GPRS) Support Nodes (SGSN). The MMEs 222 manage mobility aspects in access such as gateway selection and tracking area list management. The HSS 228 comprises a database for network users, including subscription-related information to support the network entities' handling of communication sessions. The EPC network 220 may comprise one or several HSSs 228, depending on the number of mobile subscribers, on the capacity of the equipment, on the organization of the network, etc. For example, the HSS 228 can provide support for routing/roaming, authentication, authorization, naming/addressing resolution, location dependencies, etc.

The S-GW 224 terminates the interface toward the E-UTRAN 210, and routes data packets between the E-UTRAN 210 and the EPC network 220. In addition, it can be a local mobility anchor point for inter-eNodeB handovers and also can provide an anchor for inter-3GPP mobility. Other responsibilities can include lawful intercept, charging, and some policy enforcement.

The S-GW 224, the MMEs 222, and the HSS 228 can be implemented in one physical node or separate physical nodes. The P-GW 226 terminates an SGi interface toward the packet data network (PDN). The P-GW 226 routes data packets between the EPC network 220 and external networks (e.g., the Internet), and can be a key node for policy enforcement and charging data collection. The P-GW 226 and S-GW 224 can be implemented in one physical node or separated physical nodes. In this embodiment, the EPC network 220 is shown to be communicatively coupled to a CSP 230. In some embodiments, packet data can be exchanged via the P-GW 226, while authentication data for CIoT UEs can be exchanged via the HSS 228 (as described in further detail below).

Figure 3:
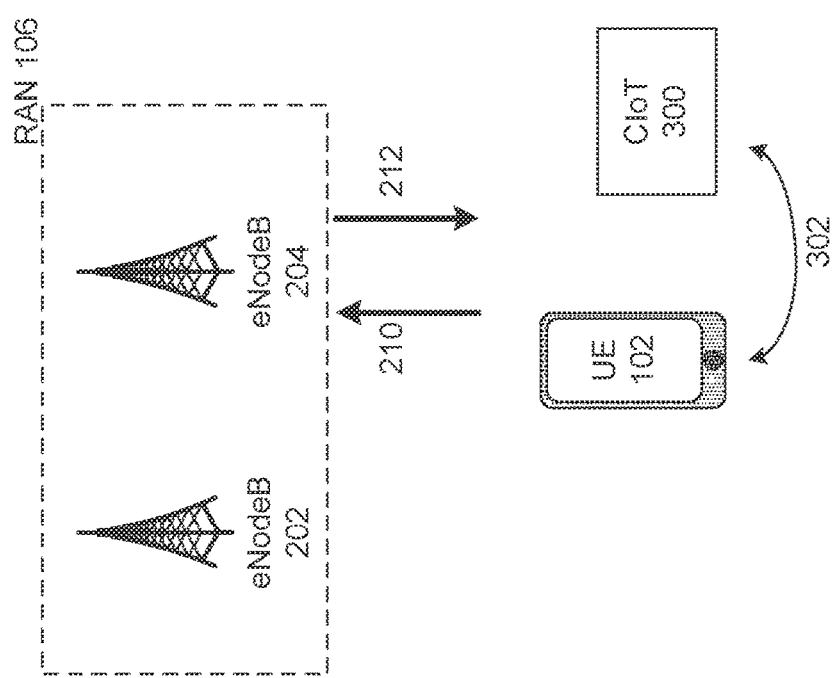
FIG. 3 illustrates user equipment communications in accordance with some embodiments.

FIG. 3 illustrates user equipment communications in accordance with some embodiments. In this embodiment, the RAN 106 comprises an E-UTRAN and is shown to include eNodeBs 202 and 204 (which can operate as base stations) for communicating with the UEs 102 and 300. The eNodeBs 202 and 204 can be any of macro eNodeBs, low-power (LP) eNodeBs, etc.

In some embodiments, a D2D communication link 302 is used to allow the UE 102 and the CIoT UE 300 to communicate directly with each other without using the RAN 106. D2D services may alternatively be referred to herein as proximity-based services (ProSe). Device discovery signal resources allocation and high-layer signaling procedures can be initially communicated to the UEs 102 and 300 from any of the eNodeBs 202 and 204 to enable D2D communication in an efficient way. A D2D communication can comprise a proximity-based device discovery, a D2D communication between devices, or a combination of both communications (i.e., a proximity-based device discovery followed by a subsequent D2D communication).

The CIoT UE 300 can comprise a coverage-constrained device or a device with limited connectivity resources—e.g., devices operating primarily for machine-type communication (MTC) or machine-to-machine (M2M) communications (e.g., sensor devices, controller devices, etc.). These devices can have limited coverage and processing capabilities (similarly, devices may operate in a coverage-constrained mode to limit power/resource consumption), can have limited or no user interface, and can be used for machines or devices with little mobility. CIoT devices can be deployed in usage scenarios such as home automation (e.g., security, appliances, energy packages, etc.), industry automation, and smart cities with low-power devices (e.g., devices having a battery life of several years), and can be easily installed and operated in challenging coverage conditions, such as lower or basement levels of buildings.

CIoT devices can be further configured to connect to an existing or future wireless-wide area network (WWAN) or cellular network. CIoT devices can be provisioned to connect to a specified cellular carrier network and an associated CSP. In other embodiments, CIoT devices can be configured to connect to any cellular carrier network. In these embodiments, the CSP and cellular carrier may be two different entities. The CSP can execute end2end solutions—e.g., service portal, service sign-up, etc.—while the cellular carrier can provide the bulk data pipe to the CSP.

Figure 4:
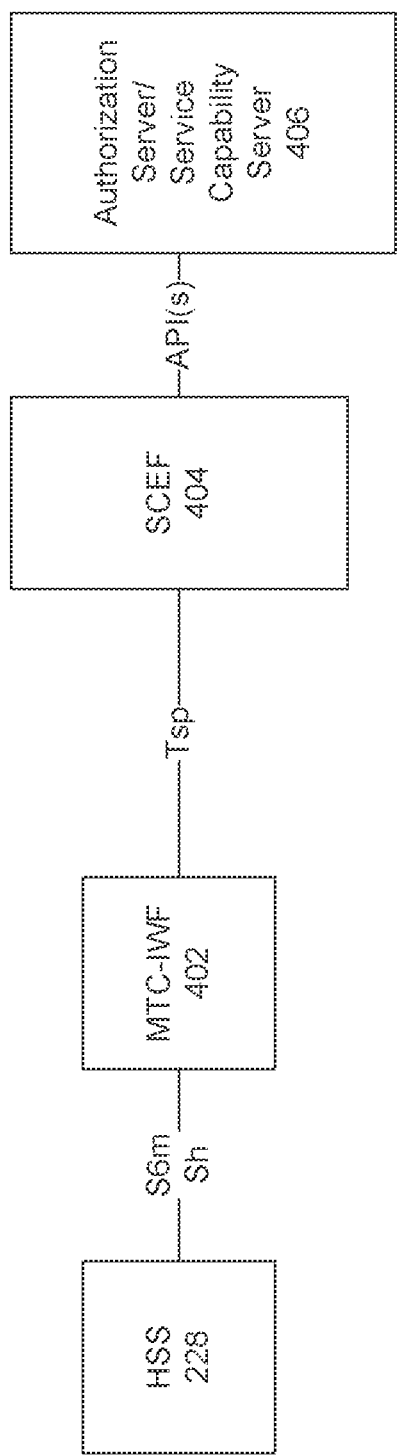
FIG. 4 illustrates an architecture of components of an LTE network to support machine-type communications in accordance with some embodiments.

FIG. 4 illustrates an architecture of components of an LIE network to support MTC communications in accordance with some embodiments. At least some of these components can be included, for example, in a Home Public Land Mobile Network (HPLMN). In this embodiment, the HSS 228 is shown to be communicatively coupled to an MTC interworking function (MTC-IWF) 402 via a diameter-based S6m and/or Sh interface. In this embodiment, the S6m interface allows the MTC-IWF 402 to retrieve subscription data and to perform any mapping between different identities associated with an MTC UE (e.g., a CIoT UE); to request routing information from the HSS 228; to perform authorization of an Authorization Server/Service Capability Server (AS/SCS) 406, thereby allowing the AS/SCS 406 to send a device trigger to the MTC UE, etc. The Sh interface allows for the HSS 228 and the MTC-IWF 402 to download and update transparent and non-transparent user data, to request and send notifications regarding changes to user data, etc.

The AS/SCS 406 is an entity which connects MTC application servers (such as CSP 230 of FIG. 2) to a cellular network to enable them to communicate through specific network-defined services with MTC UEs and with the MTC-IWF 402. The AS/SCS 406 can be controlled by the operator of the HPLMN or by an MTC Service Provider.

A Service Capability Exposure Function (SCEF) 404 provides an interface to securely expose the services and capabilities provided by the various network interfaces to external application providers. The SCEF 404 provides access to network capabilities through homogenous network application programming interfaces (APIs), and interfaces with the MTS-IWF 402 via a Tsp interface. With regards to the diameter protocol defined over the Tsp interface, the MTC-IWF 402 functions as the diameter server, in the sense that it is the network element that handles action requests and sends notifications for a particular realm. The SCEF 404 acts as the diameter client, in the sense that it is the network element requesting actions and handles notifications from the MTC-IWF 402.

Embodiments described below execute processes for linking a CIoT UE to an existing customer account with a CST. The CIoT UE can be configured and provisioned to connect to a carrier network operator by the CSP. In some embodiments, the CSP can provision and configure CIoT UEs prior to shipment (i.e., prior to a user purchasing the device). In other embodiments, a user (or an account holder of a CSP) purchases a compliant and certified CIoT UE for subsequent provisioning by a cellular network and CSP. In either embodiment, the user is able to easily and conveniently pair a CIoT UE to her existing account with the CSP.

Some embodiments describe modules, logic, and/or circuitry to execute within a 3GPP network framework for authenticating and connecting qualified, authorized devices to a core network, to provide an end2end solution for adding a certified CIoT UE to an existing customer account with a CSP. Embodiments combine service authorization with the cellular access network flow for efficiency and for protecting the cellular network from, for example, malicious denial of service (DOS) attacks. Embodiments may also use other UEs via wireless connectivity (e.g., near field communications (NFC)) to execute a process for provisioning and activating a carrier agnostic CIoT UE.

Figure 5:
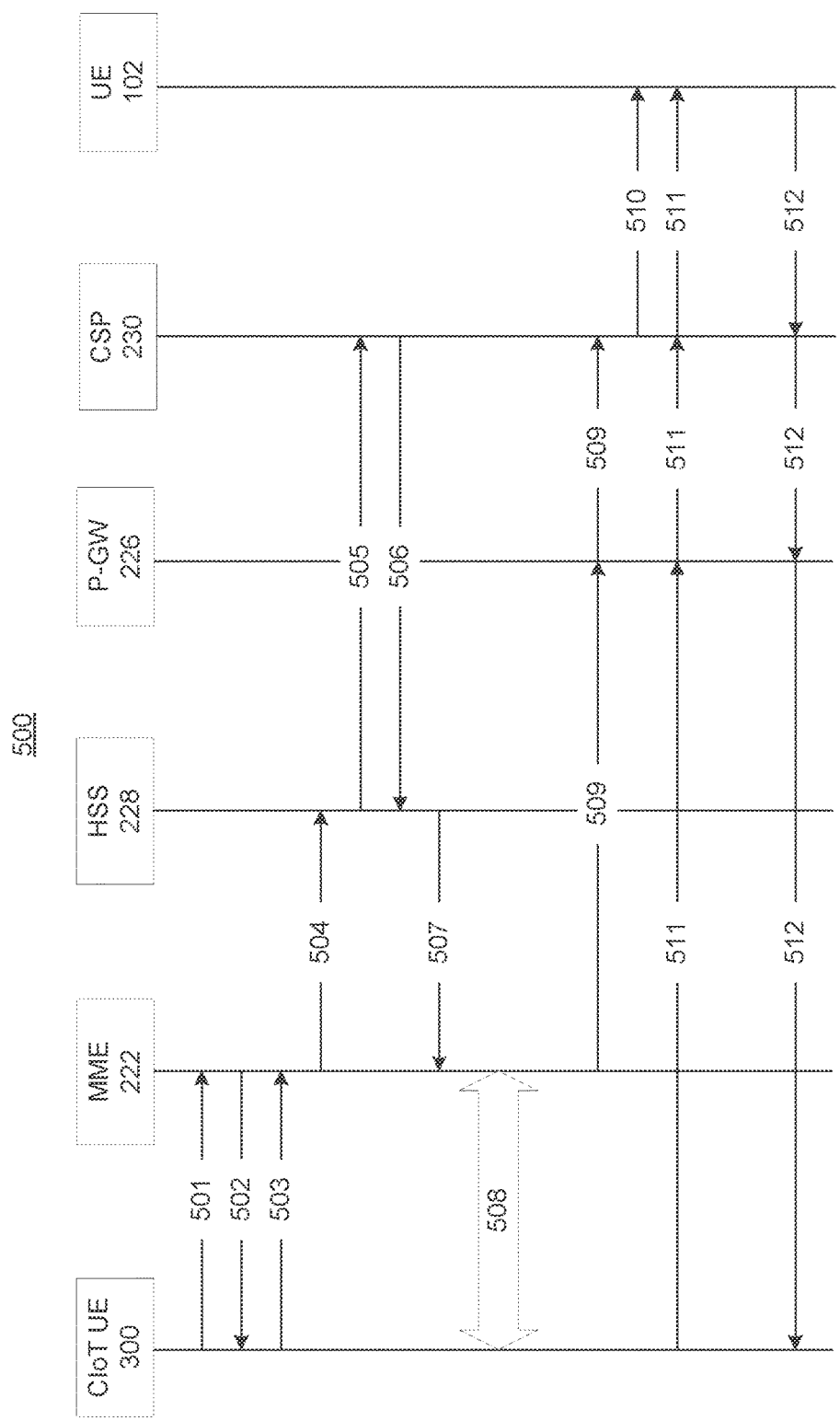
FIG. 5 illustrates a flow diagram of a process for communicatively coupling a cellular Internet of Things user equipment to a network in accordance with some embodiments.

FIG. 5 illustrates a flow diagram of a process for communicatively coupling a CIoT UE to a network in accordance with some embodiments. Process and logical flow diagrams as illustrated herein provide examples of sequences of various process actions. Although the actions are shown in a particular sequence or order, unless otherwise specified, the order of the actions may be modified. Thus, the described and illustrated implementations should be understood only as examples, and the illustrated processes may be performed in a different order, and some actions may be performed in parallel. Additionally, one or more actions may be omitted in various embodiments; thus, not all actions are executed in every implementation. Other process flows are possible.

A process 500 is shown to comprise operations for adding the CIoT UE 300 to a user account associated with the CSP 230. In this embodiment, the CIoT UE 300 is pre-provisioned by the CSP 230. The CIoT UE 300 includes a compliant and certified secure element to store security information. This security information can include a master key similar to a 3G Ki embedded in a Universal Subscriber Identity Module (USIM) application. Device information can include a device model, serial number, manufacturer ID, etc. Network information can include supported carrier network operators.

The process 500 can use an attach procedure to establish a security association between the CIoT UE 300 and the CSP 230. A secure connection(s) can he established between the CSP 230 and one or more associated cellular networks. The above-described Sh/S6m interface can be modified for the enhanced security contexts associated with the request/response operations discussed below. Alternatively, a new HTTP-based interface can be defined between the HSS 228 and the CSP 230.

In some embodiments, a user can execute an application related to the CSP 230 on the UE 102. The user can also have an account associated with the CSP 230. Prior to executing the process 500, the user can initiate an automatic device detection (ADD) procedure by, for example, transmitting a serial number of the CIoT UE 300 or a scan of a Quick Response (QR) code printed on the CIoT UE 300 to the CSP 230.

In response to the user activating the CIoT UE 300, the CIoT UE 300 chooses and connects to an appropriate cellular network provider according to its network list and policy via an attachment message sent to the MME 222 (shown as operation 501). As a part of this process, the CIoT UE can convey an Access Point Name (APN) assigned to the CSP 230, in addition to pertinent device information such as serial number, manufacturer ID, etc.

Upon receiving an attachment message including the APN associated with the CSP 230, the MME 222 sends an identity request message to the CIoT UE 300 (shown as operation 502). The CIoT UE 300 sends an identity response message including device information (i.e., serial number and manufacturer ID, etc.) to the MME 222 (shown as operation 503). The MME 222 sends the received device information and the APN associated with the CSP 230 to the HSS 228 (shown as operation 504) in order for the HSS 228 to subsequently obtain the key materials to complete the device attachment process.

In response to the HSS 228 confirming that the APN is associated with the CSP 230, the HSS 228 requests authorization and key materials from the CSP 230 via an established secure connection (shown as operation 505). The CSP 230 binds the request with the customer account (based on a pending device pair initiated earlier) and sends the key materials (e.g., a Ki for 3G/4G cellular protocols, a K for LTE cellular protocols, and so forth) to the HSS 228 (shown as operation 506). As discussed above, in this embodiment, the CIoT UE 300 is pre-provisioned by the CSP 230, and thus already includes the key materials (e.g., Ki/K).

The HSS 228 utilizes the received key materials to compute a session key (e.g., based on the Ki/K received from the CSP 230 and a random number) and sends it to the MME 222 (shown as operation 507). An authentication and key agreement (AKA) attachment process 508 is then executed by the MME 222 and the CIoT UE 300 based, at least in part, on the received identification information of the CIoT UE 300 and the CSP authentication data for the CIoT UE 300 (e.g., the CIoT UE 300 can compute the same session key based on the Ki stored in the CIoT UE 300 and the same random number).

Upon completion of the AKA attachment process 508, the MME 222 sends a "device authenticated" confirmation message to the CSP 230 via the P-GW 226 (or the S-GW 224) (shown as operation 509). The CSP 230 sends a message to the user's application executing on the UE 102 that the CIoT UE 300 has been added to the CSP provider account (shown as operation 510). In some embodiments, the user can view the CIoT UE 300 as listed under "paired devices" shown by the service provider application.

The UE 102 is subsequently able to receive notifications 511 (via the P-GW 226 and the CSP 230, as illustrated) from the CIoT UE 300, and transmit commands 512 (via the P-GW 226 and the CSP 230, as illustrated) to the CIoT UE to control the device remotely. For example, the CIoT UE 300 may receive notifications of a machine status, and may transmit a command for the machine to execute an operation.

Figure 6:
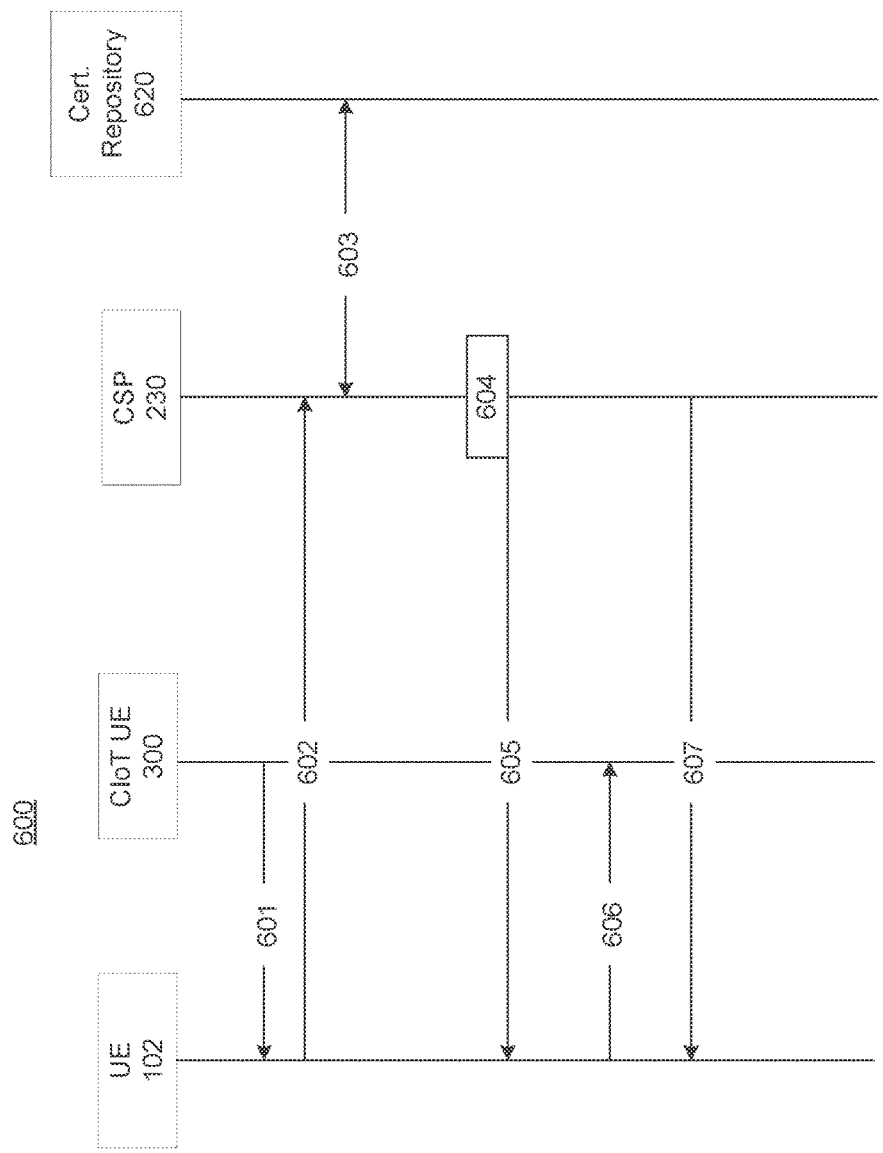
FIG. 6 illustrates a flow diagram of a process for provisioning a cellular Internet of Things user equipment in accordance with some embodiments.

FIG. 6 illustrates a flow diagram of a process for provisioning a CIoT UE in accordance with some embodiments. A process 600 is shown utilizing NFC operations for adding the CIoT UE 300 to the CSP 230. The CIoT UE 300 is configured with appropriate device and some security configuration information by the device manufacturer. Device information can includes device model information, serial number, manufacturer ID, etc. Device security information can include a public/private key pair burned at the time of manufacturing and a uniform resource locator (URL) to a web site containing the certificate chain for the CIoT UE 300. The CIoT UE 300 can include a compliant and certified secure element to store security information. In this example, however, the CIoT UE 300 is not pre-provisioned by the CSP 230 and to include some (or all) the key materials (e.g., Ki/K).

The CIoT UE 300 includes a secure programmable NFC radio operating in passive mode. A direct connection can be utilized between the NFC radio and a secure element—e.g., via a single wire protocol. The UE 102 also includes an NFC radio capable of reading from and writing to a passive NFC tag. Subsequent to a user executing a service provider application related to the CSP 230 via the UE 102, the user can initiate an NFC communication session by tapping the UE 102 on the CIoT UE 300 to receive information related to device certification of the CIoT UE 300 (e.g., a URL identifying a certificate repository 620) and, in some embodiments, other device-specific information (shown as operation 601). The information received from the CIoT UE 300 is sent to the CSP 230 (shown as operation 602).

The CSP 230 requests and receives the device certificate from the certificate repository 620 identified from said URL (shown as operation 603). The CSP 230 executes a validation process for the device certificate using a root of trust key (e.g., to determine if the device certificate is invalid or expired) (shown as operation 604). The certificate can also be verified to include a corresponding device serial number, device ID, manufacturer ID, etc. Furthermore, the device certificate can comprise a file size of several thousand bytes. In some embodiments, operations described to send the device certificate may instead send an access link (e.g., a URL) to the device certificate. The URL is a link to the certificate repository. In some embodiments, the resource name of the URL includes text associated with some device information so that the URL directly accesses the certificate relevant to the device.

The CSP 230 transmits the configuration information (including network policy, etc.) and master key (e.g., Ki/K), encrypted by the device public key, to the UE 102 (shown as operation 605). The user is instructed to initiate an NFC communication session by tapping the UE 102 on the CIoT UE 300 to transfer the configuration information to the device (shown as operation 606). The configuration information can include an integrity check field. The CSP 230 can subsequently instruct the user via the application executing on the UE 1102 to turn on the CIoT UE 300 (shown as operation 607). Once the CIoT UE 300 is powered on, it now includes the master key (e.g., Ki/K) and an attachment and provisioning process similar to that of the process 500 of FIG. 5 can be executed.

Figure 7A:
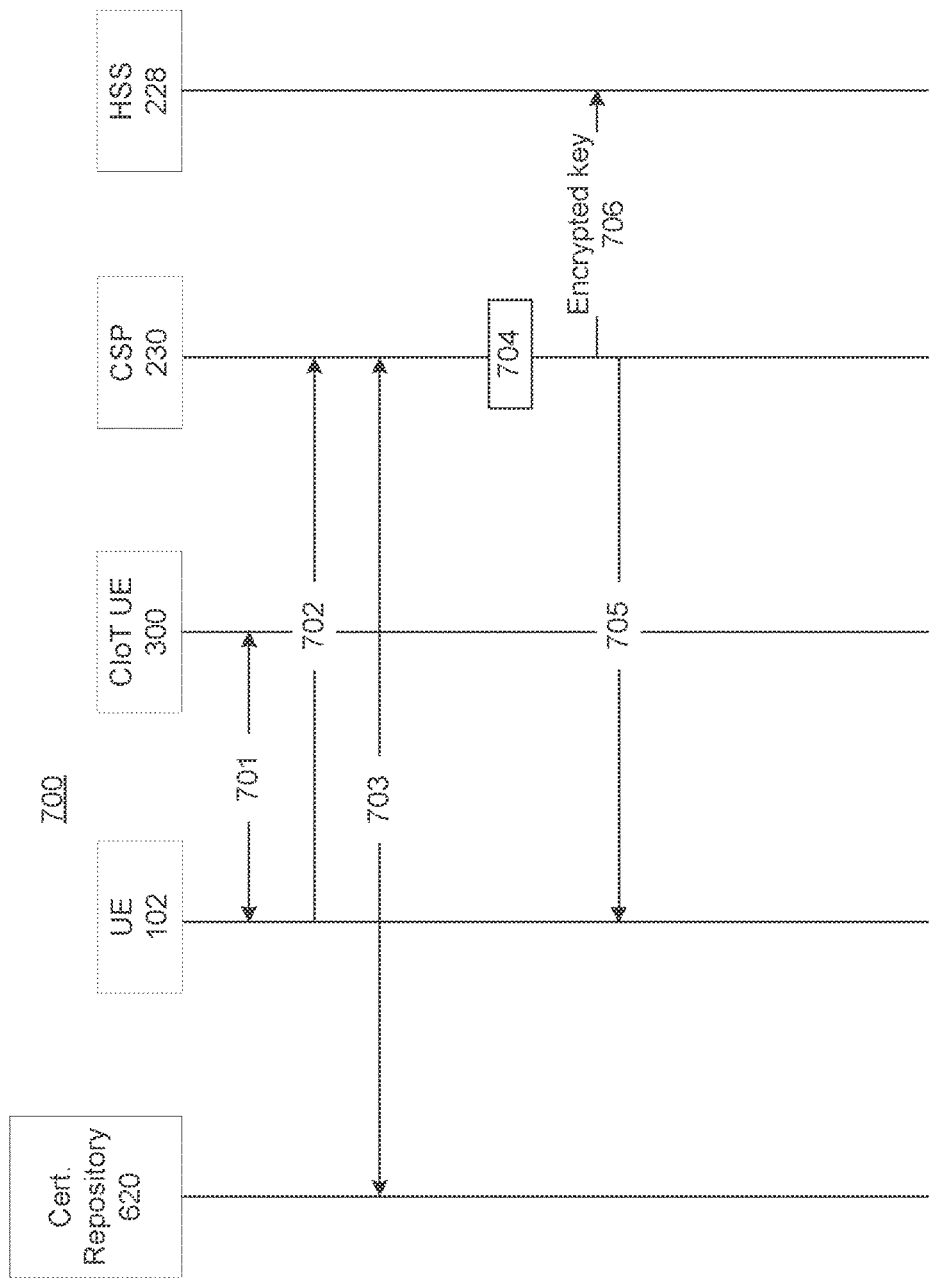

FIG. 7A illustrates a flow diagram of a process for provisioning a CIoT UE in accordance with some embodiments. A process 700 includes operations wherein an NFC communication session is not utilized (e.g., for embodiments where the CIoT UE 300 does not include an FEC radio). In this example, the CIoT UE 300 is not pre-provisioned by the CSP 230 and to include some (or all) the key materials (e.g., Ki/K) and the configuration information (e.g., Cloud Service Provider ID, SP_APN, list of supported network operators by the cloud service provider, etc.).

The user launches a service provider application associated with the CSP 230 via the UE 102. The user obtains information printed on the CIoT UE 300, such as a printed QR code or URL, via the UE 102 (e.g., via capturing image data of the printed QR code or URL through manual data entry, etc.) (shown as operation 701). This obtained information is transmitted to the CSP 230 (shown as operation 702).

The CSP 230 requests and receives the device certificate from the certificate repository 620 identified from said URL (shown as operation 703). The CSP 230 executes a validation process for the device certificate using a root of trust key (e.g., to determine if the device certificate is invalid or expired) (shown as operation 704). The certificate can also be verified to include corresponding device serial number, device ID, manufacturer ID, etc.

The CSP 230 can subsequently instruct the user via the application executing on the UE 102 to turn on the CIoT UE 300 (shown as operation 705). Once the CIoT UE 300 is powered on, an attachment process similar to that of the process 500 of FIG. 5 can be execute& however, in this embodiment, the CIoT UE 300 does not yet possess the master key. Thus, in addition to the master key (equivalent to the Ki embedded in USIM), the CSP 230 can also include an encrypted version of the master key (to be conveyed to the CIoT UE 300 during an AKA flow exchange) in a message to the HSS 228 (shown as operation 706). The master key can be encrypted by the public key of the CIoT UE 300.

In some embodiments, the CIoT UE 300 is configured to operate with a plurality of cellular network providers (such that the CIoT UE 300 is not limited for users subscribed to a specific cellular network provider). in some embodiments, the CIoT UE 300 can go through its supported cellular network provider fist until a successful connection is established. Therefore, in these embodiments, the CSP 230 may push the message of the operation 706 to HSS entities associated with said plurality of cellular network providers. Once the CIoT UE 300 is connected to the appropriate cellular network provider, the CIoT UE 300 may be provisioned with the desired carrier list and other enhancements.

FIG. 7B illustrates a process 750 for the CIoT UE to obtain the master key (e.g., Ki/K). In this example, the process 750 is executed subsequent to the execution of the process 700 of FIG. 7A. In response to the user activating the CIoT UE 300, the CIoT UE 300 connects to a cellular network provider an attachment message sent to the MME 222 (shown as operation 751).

Upon receiving an attachment message including the APN associated with the CSP 230, the MME 222 sends an identity request message to the CIoT UE 300 (shown as operation 752). The CIoT UE 300 sends an identity response message including the device certificate to the MME 222 (shown as operation 753). The MME 222 sends the received device certificate to the HSS 228 (shown as operation 754) in order for the HSS 228 to subsequently obtain the key materials for the CIoT UE 300. As discussed above, in some embodiments, instead of the device certificate, an access link (e.g., a URL) to the device certificate can be sent.

The HSS 228 requests authorization and key materials from the CSP 230 via an established secure connection (shown as operation 755). This request message can include the device certificate. The CSP 230 binds the request with the customer account and sends the key materials (e.g., Ki/K) to the HSS 228 (shown as operation 756). In some embodiments, the key materials are encrypted by a public key. In some embodiments, the CSP 230 further sends device information associated with the device certificate serial number and manufacturer ID, etc.) The HSS sends this material to the MME 222 (shown as operation 757). The MME 222 sends this material to the CIoT UE 300 (shown as operation 758). In some embodiments, the MME 222 sends this material via an attach reject message upon receiving the attach request message, the CIoT UE 300 stores the key materials (and any other data), and re-attempts any of the device attachment processes discussed above. For example, the process 500 of FIG. 5 may subsequently be executed.

Figure 8:
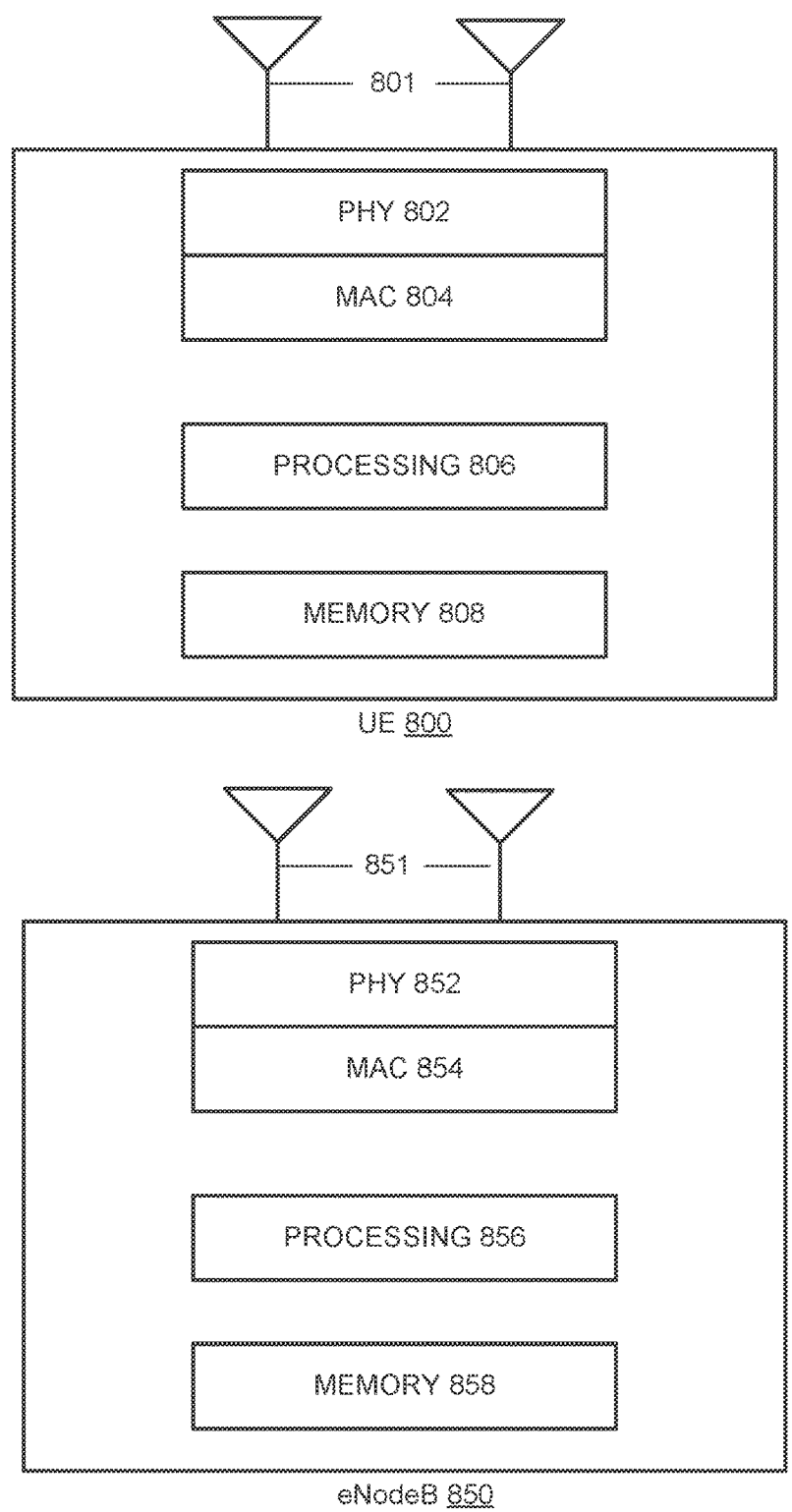
FIG. 8 illustrates a block diagram of a user equipment and an eNodeB in accordance with some embodiments.

FIG. 8 illustrates a block diagram of a UE 800 and an eNodeB 850, in accordance with some embodiments. It should be noted that in some embodiments, the eNodeB 850 can be a stationary (non-mobile) device. The UE 800 can include physical layer circuitry (PHY) 802 for transmitting and receiving signals to and from the eNodeB 850, other eNodeBs, other UEs, or other devices using one or more antennas 801, while the eNodeB 850 can include physical layer circuitry (PHY) 852 for transmitting and receiving signals to and from the UE 800, other eNodeBs, other UEs, or other devices using one or more antennas 851. The UE 800 can also include medium access control layer (MAC) circuitry 804 for controlling access to the wireless medium, while the eNodeB 850 can also include MAC circuitry 854 for controlling access to the wireless medium. The UE 800 can also include processing circuitry 806 and memory 808 arranged to perform the operations described herein, and the eNodeB 850 can also include processing circuitry 856 and memory 858 arranged to perform the operations described herein.

The antennas 801, 851 can comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas 801, 851 can be effectively separated to benefit from spatial diversity and the different channel characteristics that can result.

Although the UE 800 and eNodeB 850 are each illustrated as having several separate functional elements, one or more of the functional elements can be combined and can be implemented by combinations of software-configured elements, such as processing elements including digital signal processors (DSPs), and/or other hardware elements. For example, some elements can comprise one or more microprocessors, DSPs, field-programmable gate arrays (FPGAs), application specific integrated circuits (ASICs), radio-frequency integrated circuits (RFICs), and combinations of various hardware and circuitry for performing at least the functions described herein. In some embodiments, the functional elements can refer to one or more processes operating on one or more processing elements.

Embodiments can be implemented in one or a combination of hardware, firmware, and software. Embodiments can also be implemented as instructions stored on a computer-readable storage device, which can be read and executed by at least one processor to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash memory devices, and other storage devices and media. Some embodiments can include one or more processors and can be configured with instructions stored on a computer-readable storage device.

In accordance with embodiments, the UE 800 can operate in accordance with a D2D communication mode. The UE 800 can include processing circuitry 806 configured to determine a synchronization reference time based on reception of one or more signals from the eNodeB 850. The hardware processing circuitry 806 can be further configured to, during a D2D communication session, transmit Multi-Time Transmission Interval Bundle Groups (MTBGs) of data symbols during a first group of data transmission intervals (DTIs) and refrain from transmission of data symbols during a second group of DTIs that is exclusive of the first group of DTIs. Starting times of the DTIs can be based at least partly on the synchronization reference time. The hardware processing circuitry 806 can be further configured to transmit, during an in-network communication session exclusive of the D2D communication session, data symbols according to a time transmission interval (TTI) reference time that is synchronized to the synchronization reference time.

In some scenarios, the UE 800, operating in a cellular communication network, can begin to experience performance degradation for various reasons. As an example, user loading or throughput demands of the network can become high. As another example, the UE 800 can move toward or beyond the edges of coverage cells. While operating in the network, the UE 800 can actually be in communication with other UEs that are physically located in close proximity to the UE 800, although the communication can take place through the network.

Figure 9:
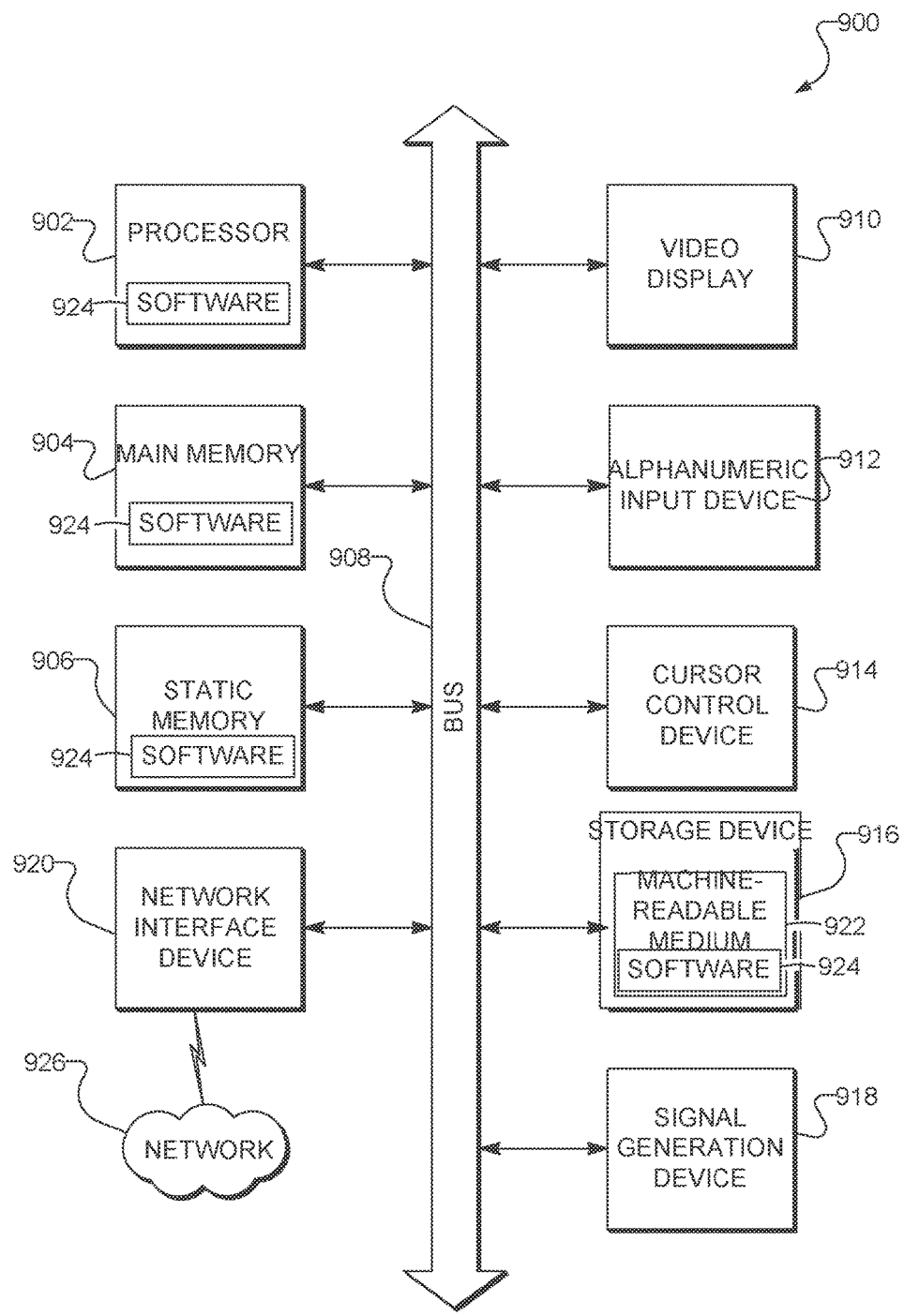
FIG. 9 illustrates a block diagram illustrating components of a machine, according to some example embodiments, able to read instructions from a machine-readable medium and perform any one or more of the methodologies discussed herein, according to aspects of the disclosure.

FIG. 9 illustrates a block diagram illustrating components of a machine, according to some example embodiments, able to read instructions from a machine-readable medium and perform any one or more of the methodologies discussed herein, according to aspects of the disclosure. In particular, FIG. 9 illustrates an exemplary computer system 900 (which can comprise any of the network elements discussed above) within which software 924 for causing the machine to perform any one or more of the methodologies discussed herein can be executed. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The computer system 900 can function as any of the above described UEs or eNodeBs, and can be a personal computer (PC), a wearable mobile computing device, a tablet PC, a set-top box (STB), a PDA, a cellular telephone, a web appliance, a network router, switch, or bridge, or any machine capable of executing instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (CPU), or both), a main memory 904, and a static memory 906, which communicate with each other via a bus 908. The computer system 900 can further include a video display unit 910 (e.g., an LCD or a cathode ray tube (CRT)). The computer system 900 also includes an alphanumeric input device 912 (e.g., a keyboard), a user interface navigation (or cursor control) device 914 (e.g., a mouse), a storage device 916, a signal generation device 918 (e.g., a speaker), and a network interface device 920.

The storage device 916 includes a non-transitory machine-readable medium 922 on which is stored one or more sets of data structures and software 924 embodying or utilized by any one or more of the methodologies or functions described herein. The software 924 can also reside, completely or at least partially, within the main memory 904 and/or within the processor 902 during execution thereof by the computer system 900, with the main memory 904 and the processor 902 also constituting, non-transitory machine-readable media 922. The software 924 can also reside, completely or at least partially, within the static memory 906.

While the non-transitory machine-readable medium 922 is shown in an example embodiment to be a single medium, the term "machine-readable medium" can include a single medium or multiple media (e.g., a centralized or distributed database, and/or associated caches and servers) that store the one or more data structures and software 924. The term "machine-readable medium" can also be taken to include any tangible medium that is capable of storing, encoding, or carrying instructions for execution by the machine and that cause the machine to perform any one or more of the methodologies of the present embodiments, or that is capable of storing, encoding, or carrying data structures utilized by or associated with such instructions. The term "machine-readable medium" can accordingly be taken to include, but not be limited to, solid-state memories, and optical and magnetic media. Specific examples of machine-readable media 922 include non-volatile memory, including by way of example semiconductor memory devices (e.g., erasable programmable read-only Memory (EPROM), electrically erasable programmable read-only memory (EEPROM), and flash memory devices); magnetic disks such as internal hard disks and removable disks; magneto-optical disks; and compact disc read-only memory (CD-ROM) and digital versatile disc (or digital video disc) read-only memory (DVD-ROM) disks.

The software 924 can further he transmitted or received over a communications network 926 using a transmission medium. The software 924 can be transmitted using the network interface device 920 and any one of a number of well-known transfer protocols (e.g., HyperText Transfer Protocol (HTTP)). Examples of communication networks include a local area network (LAN), a wide area network (WAN), the Internet, mobile telephone networks, plain old telephone service (POTS) networks, and wireless data networks (e.g., WiFi and WiMax networks). The term "transmission medium" can be taken to include any intangible medium capable of storing, encoding, or carrying instructions for execution by the machine, and includes digital or analog communications signals or other intangible media to facilitate communication of such software 924.

Figure 10:
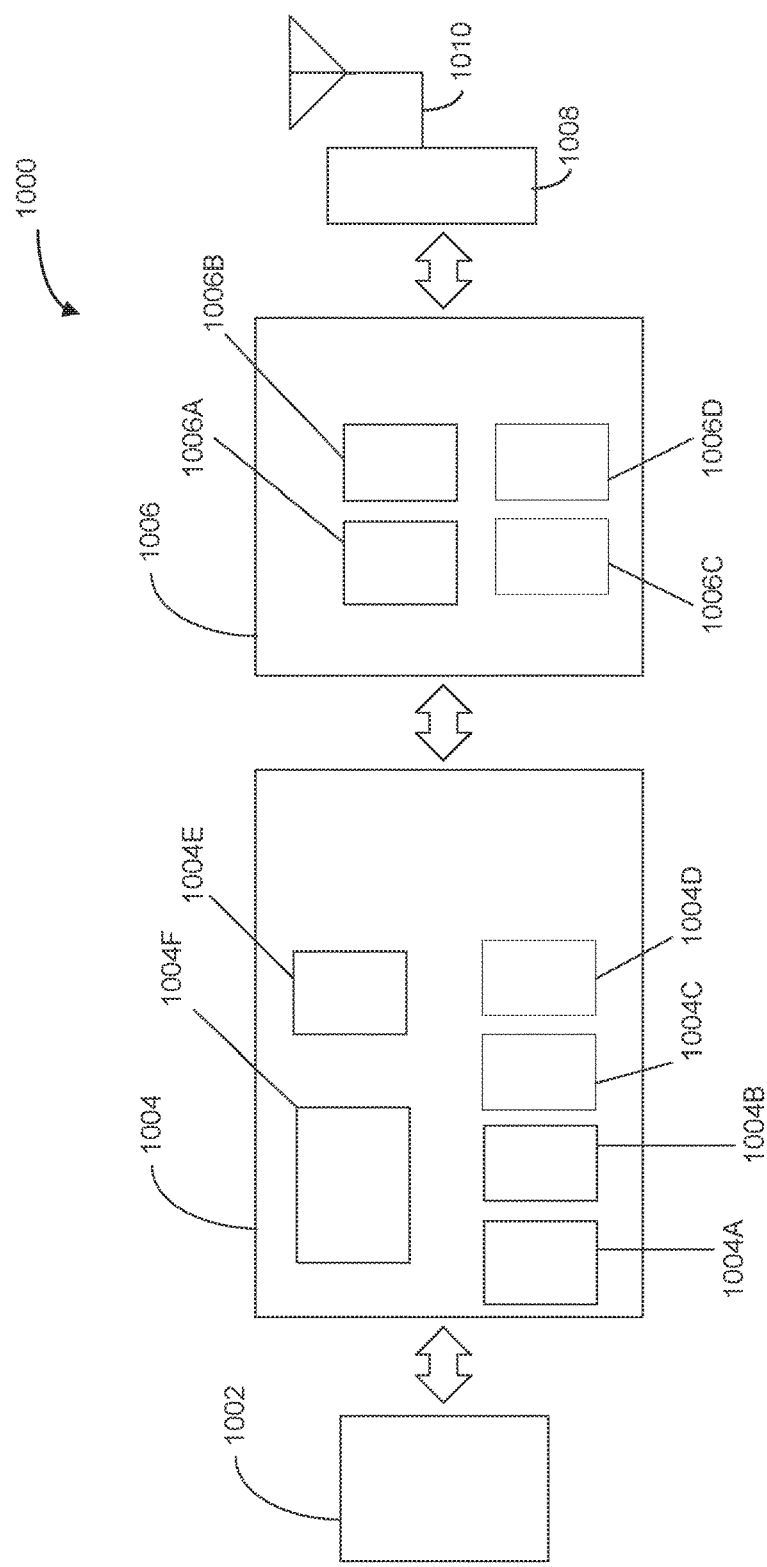
FIG. 10 illustrates example components of a user equipment in accordance with some embodiments.

FIG. 10 illustrates, for one embodiment, example components of a UE device 1000 in accordance with some embodiments. In some embodiments, the UE device 1000 may include application circuitry 1002, baseband circuitry 1004, Radio Frequency (RF) circuitry 1006, front-end module (FEM) circuitry 1008, a low-power wake-up receiver (LP-WUR) 1050, and one or more antennas 1010, coupled together at least as shown. In some embodiments, the UP device 1000 may include additional elements such as, for example, memory/storage, display, camera, sensor, and/or input/output (I/O) interface. In some embodiments, CIoT UEs may comprise less components that those illustrated and described in this example.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004a, third generation (3G) baseband processor 1004b, fourth generation (4G) baseband processor 1004c, and/or other baseband processor(s) 1004d for other existing generations, generations in development or to be developed in the fixture (e.g., fifth generation (5G), 6G, etc.). The baseband circuitry 1004 (e.g., one or more of baseband processors 1004a-d) may handle various radio control functions that enable communication with one or more radio networks via the RE circuitry 1006. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 1004e of the baseband circuitry 1004 may be configured to run elements of the protocol stack for signaling of the PHY, MAC, RLC, PDCP and/or RRC layers. In some embodiments, the baseband circuitry may include one or more audio digital signal processor(s) (DSP) 1004f. The audio DSP(s) 1004f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in sonic embodiments, the baseband circuitry 1004 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006a, amplifier circuitry 1006b and filter circuitry 1006c. The transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a, of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the clown-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006 of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c. The filter circuitry 1006c may include a low-pass filter (LPF), although the scope of the embodiments is not limited in this respect.

In some embodiments, the mixer circuitry 1006a of the receive signal path and the mixer circuitry 1006a of the transmit signal path may include two or more mixers and may be arranged for quadrature downconversion and/or upconversion respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a, may be arranged for direct downconversion and/or direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a lookup table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In sonic example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the UE 1000 comprises a plurality of power saving mechanisms. If the UE 1000 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 1000 may transition off to an RRC_Idle state, where it disconnects from the network and does not perform operations such as channel quality feedback, handover, etc. The UE 1000 goes into a very low power state and it performs paging where again it periodically wakes up to listen to the network and then powers down again. The device cannot receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

The drawings and the forgoing description give examples of the present disclosure. Although embodiments are depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the operations of any flow diagram need not be implemented in the order shown; nor do all of the operations necessarily need to be performed. Also, those operations that are not dependent on other operations can be performed in parallel with the other operations. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

Various examples of the disclosure are provided below. These examples are not intended to in any way limit the disclosure herein. In Example 1, a device for an evolved packet core (EPC) network comprises transmission circuitry to transmit a request to an eNodeB for identification information of a cellular Internet of Things (CIoT) user equipment (UE), receiver circuitry to receive a response from the eNodeB including the identification information of the CIoT UE, and receive cloud service provider (CSP) authentication data for the CIoT UE, including an encrypted master key associated with the EPC network, and processing circuitry to execute a device attachment process with the encrypted master key to attach the CIoT UE to the EPC network in response to receiving the CSP authentication data.

In Example 2, the subject matter of Example 1 can optionally have the device attachment process comprise an authentication and key agreement (AKA) authentication process to he executed based, at least in part, on the received identification information of the CIoT UE and the CSP authentication data for the CIoT UE. In Example 3, the subject matter of any of Examples 1-2 can optionally have the encrypted master key comprise a long term evolution (LTE) Authentication Key (K) used for the AKA authentication process. In Example 4, the subject matter of any of Examples 1-3 can optionally have transmission circuitry further to transmit confirmation of the AKA authentication process to one of a serving gateway (S-GW) or a packet data network gateway (PDN-GW) of the EPC network for transmission to a CSP.

In Example 5, the devices of any of Examples 1-4 may further comprise a mobility management entity (MME) module, and a home subscriber server (HSS) module, wherein the transmission circuitry and the receiver circuitry are included in the MME module, and the transmission circuitry is further to transmit the identification information of the CIoT UE to the HSS module. In Example 6, any of the devices of Examples 1-5 may have the HSS module configured to be communicatively coupled to the CSP via a Machine-Type Communications interworking Function (MTC-IWF) entity included in the EPC network. In Example 7, any of the devices of Examples 1-6 may have the HSS module configured to be communicatively coupled to the MTC-IWF entity via at least one of an S6m interface or an Sh interface, the S6m interface to be used to exchange CSP subscription data related to a user of the CIoT UE, the Sh interface to be used to exchange CSP user data for the user of the CIoT UE.

In Example 8, any of Examples 1 may have the identification information of the CIoT UE include a device serial number or manufacturer identification data. In Example 9, any of the devices of Examples 1-8 may have the identification information of the CIoT UE include an access point name (APN) associated with the CSP.

In Example 10, any of the devices of Examples 1-9 may further comprise an antenna, communicatively coupled to the transmission circuitry and the receiver circuitry, to exchange signal data with the eNodeB.

In Example 11, a non-transitory computer-readable storage medium comprises contents that, when executed by a computing system, cause the computing system to perform operations to detect a cellular Internet of Things (CIoT) user equipment (UE) at an evolved packet core (EPC) network, transmit a request to an eNodeB for identification information of the CIoT UE, receive a response message from the eNodeB including the identification information of the CIoT UE, transmit the identification information of the CIoT UE to a home subscriber server (HSS), receive cloud service provider (CSP) authentication data for the CIoT UE from the HSS, including an encrypted master key associated with the EPC network, and attach the CIoT UE to the EPC network using the encrypted master key in response to receiving the CSP authentication data.

In Example 12, the operation of Example 11 to attach the CIoT UE to the EPC network may comprise an authentication and key agreement (AKA) authentication process to be executed based, at least in part, on the received identification information of the CIoT UE and the CSP authentication data for the CIoT UE. In Example 13, any of the Examples 11-12 may have the encrypted master key comprise a long term evolution (LTE) Authentication Key (K) used for the AKA authentication process. In Example 14, any of the operations of the Examples 11-13 further comprise operations to transmit confirmation of the AKA authentication process to one of a serving gateway (S-GW) or a packet data network gateway (PDN-GW) of the EPC network.

In Example 15, any of the Examples 11-14 may have the identification information of the CIoT UE include a device serial number or manufacturer identification data. In Example 16, any of the Examples 11-15 may have the identification information of the CIoT UE include an access point name (APN) associated with the CSP.

In Example 17, the non-transitory computer-readable storage medium of any of the Examples 11-16 may further comprise contents that, when executed by the computing system, cause the computing system to perform operations to transmit the encrypted master key to the CIoT UE via an ATTACH_REJECT message Example 18 describes a user equipment (UE) comprising processing circuitry to establish a communication session with a cellular Internet of Things (CIoT) UE via a short range communications protocol, receiver circuitry to receive device certification information associated with a cloud services provider (CSP) from the CIoT UE, and receive device configuration information from the CSP, the device configuration information to include an encrypted key for the CIoT UE and associated with a cellular network provider, and transmission circuitry to transmit user login information and the device certification information to the CSP, and transmit the device configuration information to the CIoT UE via the short range communications protocol.

In Example 19, the transmission circuitry of Example 18 comprises a contactless front-end (CLF) interface, wherein the short range communications protocol comprises a near field communications (NFC) protocol. In Example 20, the short range communications protocol of any of the Examples 18-19 comprises a proximity-based service (ProSe) device-to-device (D2D) communications protocol. In Example 21, the CIoT UE of any of the Examples 18-20 may comprise a machine-type communications (MTC) device. In Example 22, any of the Examples 18-21 may have the encrypted master key comprise a long term evolution (LTE) Authentication Key (K).

Example 23 describes an apparatus for attaching mobile devices to a network, comprising means for detecting a cellular Internet of Things (CIoT) user equipment (UE) at an evolved packet core (EPC) network, means for transmitting request to an eNodeB for identification information of the CIoT UE, means for receiving a response message from the eNodeB including the identification information of the CIoT UE, means for transmitting the identification information of the CIoT UE to a home subscriber server (HSS). means for receiving cloud service provider (CSP) authentication data for the CIoT UE from the HSS, including an encrypted master key associated with the EPC network, and means for attaching the CIoT UE to the EPC network using the encrypted master key in response to receiving the CSP authentication data.

In Example 24, the apparatus of Example 23 may have the means for attaching the CIoT UE to the EPC network comprises means for executing an authentication and key agreement (AKA) authentication process based, at least in part, on the received identification information of the CIoT UE and the CSP authentication data for the CIoT UE.

In Example 25, any of the Examples 23-24 may have the encrypted master key comprises a long term evolution (LTE) Authentication Key (K) used for the AKA authentication process.

In Example 26, any of the apparatuses of the Examples 23-25 may further comprise means for transmitting confirmation of the AKA authentication process to one of a serving gateway (S-GW) or a packet data network gateway (PDN-GW) of the EPC network.

In Example 27, any of the apparatuses of the Examples 23-26 may have the identification information of the CIoT UE include a device serial number or manufacturer identification data.

In Example 28, any of the apparatuses of the Examples 23-27 may have the identification information of the CIoT UE include an access point name (APN) associated with the CSP.

In Example 29, any of the apparatus of the Examples 23-28 may further comprise means for transmitting the encrypted master key to the CIoT UE via an ATTACH_REJECT message.

Example 30 describes a user equipment (UE) for communicating with a cellular Internet of Things (CIoT) UE, comprising processing circuitry to establish a communication session the CIoT UE via a short range communications protocol, receiver circuitry to receive device certification information associated with a cloud services provider (CSP) from the CIoT UE, and receive device configuration information from the CSP, the device configuration information to include an encrypted key for the CIoT UE and associated with a cellular network provider, and transmission circuitry to transmit user login information and the device certification information to the CSP, and transmit the device configuration information to the CIoT UE via the short range communications protocol.

The invention claimed is:

1. A non-transitory computer-readable storage medium comprising contents that, when executed by a computing system, cause the computing system to perform operations to:
   detect an unattached cellular Internet of Things (CIoT) user equipment (HE) at an evolved packet core (EPC) network;
   transmit a request to an eNodeB for identification information of the CIoT UE;
   receive a response message from the eNodeB including the identification information of the CIoT UE;
   transmit the identification information of the CIoT UE to a home subscriber server (HSS);
   receive cloud service provider (CSP) authentication data for the CIoT LTE from the HSS, including an encrypted master key associated with an evolved packet core (EPC) network; and
   attach the CIoT UE to the EPC network using the encrypted master key in response to reception of the CSP authentication data.

2. The non-transitory computer-readable storage medium of claim 1, wherein the operation to attach the CIoT UE to the EPC network comprises an authentication and key agreement (AKA) authentication process to be executed based, at least in part, on the received identification information of the CIoT UE and the CSP authentication data for the CIoT UE.

3. The non-transitory computer-readable storage medium of claim 2, wherein the encrypted master key comprises a long term evolution (LTE) Authentication Key (K) used for the AKA authentication process.

4. The non-transitory computer-readable storage medium of claim 2, further comprising contents that, when executed by the computing system, cause the computing system to perform operations to:
   transmit confirmation of the AKA authentication process to one of a serving gateway (S-GW) or a packet data network gateway (PDN-GW) of the EPC network for transmission to the CSP through the HSS.

5. The non-transitory computer-readable storage medium of claim 1, wherein the identification information of the CIoT UE includes a device serial number or manufacturer identification data.

6. The non-transitory computer-readable storage medium of claim 1, wherein the identification information of the CIoT UE includes an access point name (APN) associated with the CSP.

7. The non-transitory computer-readable storage medium of claim 1, further comprising contents that, when executed by the computing system, cause the computing system to perform operations to:
   transmit the encrypted master key to the CIoT UE via an ATTACH_REJECT message.

8. The non-transitory computer-readable storage medium of claim 1, wherein:
   the CIoT UE is pre-provisioned with the encrypted master key, and
   the medium further comprises contents that, when executed by the computing system, cause the computing system to avoid transmission of the encrypted master key to the CIoT UE after reception of the encrypted master key.

9. The non-transitory computer-readable storage medium of claim 1, wherein the medium further comprises contents that, when executed by the computing system, cause the computing system to:
   transmit the encrypted master key to the CIoT UE after reception of the encrypted master key.

10. The non-transitory computer-readable storage medium of claim 1, wherein the medium further comprises contents that, when executed by the computing system, cause the computing system to:
   transmit the request in response to reception, by the reception circuitry, of an attach request from the CIoT UE, and transmit the encrypted master key in an attach reject message to the CIoT UE in response to the attach request, the attach reject message transmitted in response to addition of the encrypted master key to the CIoT UE.

11. The non-transitory computer-readable storage medium of claim 1, wherein the medium further comprises contents that, when executed by the computing system, cause the computing system to:
execute a new device attachment process and in response to reception of a new attach request received after transmission of the encrypted master key.

12. The non-transitory computer-readable storage medium of claim 1, wherein the encrypted master key is a session key based on a key received at the HSS from the CSP and a random number.

13. The non-transitory computer-readable storage medium of claim 1, wherein the identification information of the CIoT UE is a uniform resource locator (URL) link.

14. The non-transitory computer-readable storage medium of claim 1, wherein:
the HSS is communicatively coupled to the CSP and a Machine-Type Communications Interworking Function (MTC-IWF) via at least one of an S6m. interface or an Sh interface,
CSP subscription data related to a user of the CIoT UE is exchanged using the S6m interface, and
CSP user data for the user of the CIoT UE is exchanged using the Sh interface.

15. An apparatus comprising processing circuitry and memory configured to:
detect an unattached cellular Internet of Things (CIoT) user equipment (UE) at an evolved packet core (EPC) network;
generate, for transmission to an eNodeB, a request for identification information of the CIoT UE;
decode a response message from the eNodeB including the identification information of the CIoT UE;
store the identification information of the CIoT UE in the memory;
generate, for transmission to a home subscriber server (HSS), the identification information of the CIoT UE;
decode cloud service provider (CSP) authentication data for the CIoT UE from the HSS, including an encrypted master key associated with an evolved packet core (EPC) network; and
attach the CIoT UE to the EPC network using the encrypted master key in response to reception of the CSP authentication data.

16. The system of claim 15, wherein attachment of the CIoT UE to the EPC network comprises authentication using an authentication and key agreement (AKA) process that is based, at least in part, on the received identification information of the CIoT UE and the CSP authentication data for the CIoT UE.

17. The system of claim 16, wherein the encrypted master key comprises a long term evolution (LTE) Authentication Key (K) used for the AKA authentication process.

18. The system of claim 15, wherein:
the HSS is communicatively coupled to the CSP and a Machine-Type Communications Interworking Function (MTC-IWF) via at least one of an S6m interface or an Sh interface,
CSP subscription data related to a user of the CIoT UE is exchanged using the S6m interface, and
CSP user data for the user of the CIoT UE is exchanged using the Sh interface.

* * * * *

UNITED STATES PATENT AND TRADEMARK OFFICE
CERTIFICATE OF CORRECTION

| | |
|---|---|
| PATENT NO. | : 10,271,191 B2 |
| APPLICATION NO. | : 15/632790 |
| DATED | : April 23, 2019 |
| INVENTOR(S) | : Adrangi et al. |

Page 1 of 1

It is certified that error appears in the above-identified patent and that said Letters Patent is hereby corrected as shown below:

In the Claims

In Column 21, Line 64, in Claim 1, delete "(HE)" and insert --(UE)-- therefor

In Column 22, Line 6, in Claim 1, delete "LTE" and insert --UE-- therefor

Signed and Sealed this
Twenty-first Day of April, 2020

Andrei Iancu
*Director of the United States Patent and Trademark Office*